*12* United States Patent
Liu et al.

(10) Patent No.: US 8,795,899 B2
(45) Date of Patent: Aug. 5, 2014

(54) LITHIUM SUPER-BATTERY WITH A FUNCTIONALIZED NANO GRAPHENE CATHODE

(75) Inventors: Chenguang Liu, Fairborn, OH (US); Aruna Zhamu, Centerville, OH (US); David Neff, Fairborn, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 774 days.

(21) Appl. No.: 12/806,679

(22) Filed: Aug. 19, 2010

(65) Prior Publication Data

US 2012/0045688 A1    Feb. 23, 2012

(51) Int. Cl.
H01M 4/02    (2006.01)
H01M 4/13    (2010.01)
H01M 4/58    (2010.01)
H01G 11/50    (2013.01)
H01M 10/0525    (2010.01)
H01G 11/06    (2013.01)
H01G 11/38    (2013.01)
H01M 4/587    (2010.01)

(52) U.S. Cl.
CPC ............ *H01M 4/587* (2013.01); *Y02T 10/7022* (2013.01); *H01G 11/50* (2013.01); *H01M 10/0525* (2013.01); *H01G 11/06* (2013.01); *Y02E 60/122* (2013.01); *Y02T 10/7011* (2013.01); *H01G 11/38* (2013.01); *Y02E 60/13* (2013.01)
USPC ................. 429/231.8; 429/209; 429/218.1

(58) Field of Classification Search
CPC .................................................. H01M 4/587
See application file for complete search history.

(56) References Cited

U.S. PATENT DOCUMENTS

| | | | |
|---|---|---|---|
| 6,767,671 B2 * | 7/2004 | Itagaki et al. | 429/328 |
| 7,623,340 B1 | 11/2009 | Song et al. | |
| 2007/0092432 A1 * | 4/2007 | Prud'Homme et al. | 423/448 |
| 2007/0148548 A1 * | 6/2007 | Suzuki et al. | 429/231.8 |
| 2007/0218364 A1 * | 9/2007 | Whitacre et al. | 429/231.7 |

OTHER PUBLICATIONS

U.S. Appl. No. 11/800,728, filed May 8, 2007, A. Zhamu, et al.
T. Le Gall, et al. J. Power Sources, 119 (2003) 316-320.
M. D. Stoller, et al, "Graphene-based Ultracapacitor," Nano Letters, Vo. 8 (2008) pp. 3498-3502.
S. W. Lee, et al, "High Power Lithium Batteries from Functionalized Carbon Nanotubes," Nature Nanotechnology, 5 (2010) 531-537.
H. Chen, et al. "From biomass to a renewable $Li_xC_6O_6$ organic electrode for sustainable Li-ion batteries," ChemSusChem, 1 (2008) 348-355.

* cited by examiner

*Primary Examiner* — Barbara Gilliam
*Assistant Examiner* — Steven Scully
(74) *Attorney, Agent, or Firm* — Mark Levy; Thompson Hine LLP (57) ABSTRACT

An electrochemical energy storage device, lithium super-battery, comprising a positive electrode, a negative electrode, a porous separator disposed between the two electrodes, and a lithium-containing electrolyte in physical contact with the two electrodes, wherein the positive electrode comprises a plurality of chemically functionalized nano graphene platelets (f-NGP) or exfoliated graphite having a functional group that reversibly reacts with a lithium atom or ion. In a preferred embodiment, a lithium super-battery having a f-NGP positive electrode and $Li_4Ti_5O_{12}$ negative electrode exhibits a gravimetric energy ~5 times higher than conventional supercapacitors and a power density ~10 times higher than conventional lithium-ion batteries. This device has the best properties of both the lithium ion battery and the supercapacitor.

30 Claims, 8 Drawing Sheets

LITHIUM SUPER-BATTERY WITH A FUNCTIONALIZED NANO GRAPHENE CATHODE

This invention is based on the research results of a project sponsored by the US Department of Commerce NIST Technology Innovation Program. The US government has certain rights on this invention.

FIELD OF THE INVENTION

The present invention relates generally to the field of electrochemical energy storage device and more particularly to a new lithium-exchanging battery device (herein referred to as a lithium super-battery) featuring a cathode formed of functionalized nano graphene platelets (NGPs) and an anode containing a lithiated compound or lithium-containing material.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration. A battery would still be used for cruising, but supercapacitors (with their ability to release energy much more quickly than batteries) would kick in whenever the car needs to accelerate for merging, passing, emergency maneuvers, and hill climbing. The supercapacitor must also store sufficient energy to provide an acceptable driving range. To be cost- and weight-effective compared to additional battery capacity they must combine adequate specific energy and specific power with long cycle life, and meet cost targets as well. Specifically, it must store about 400 Wh of energy, be able to deliver about 40 kW of power for about 10 seconds, and provide high cycle-life (>100,000 cycles).

The high volumetric capacitance density of a supercapacitor (10 to 100 times greater than conventional capacitors) derives from using porous electrodes to create a large effective "plate area" and from storing energy in the diffuse double layer. This electric double layer (EDL), created naturally at a solid-electrolyte interface when voltage is imposed, has a thickness of only about 1 nm, thus forming an extremely small effective "plate separation." In some supercapacitors, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called double-layer charges.

Due to the notion that the formation of EDLs does not involve a chemical reaction, such as certain reduction-oxidation (redox) reactions, the charge-discharge process of a supercapacitor can be very fast, typically in seconds, resulting in very high power density. Supercapacitors are extremely attractive power sources. Compared with batteries, they require no maintenance, offer a much higher cycle-life, require a very simple charging circuit, experience no "memory effect," and are generally much safer. Physical, rather than chemical, energy storage is the key reason for their safe operation and extraordinarily high cycle-life. Perhaps most importantly, supercapacitors offer higher power density than batteries.

Despite the positive attributes of supercapacitors, there are several technological barriers to widespread implementation of supercapacitors for vehicle power or renewable energy storage applications. For instance, supercapacitors possess very high power densities, but low energy densities when compared to batteries (5-8 Wh/kg for commercial supercapacitors vs. 10-30 Wh/Kg for the lead acid battery and 50-100 Wh/kg for the NiMH battery).

On the other hand, lithium-ion batteries possess a much higher energy density (100-180 Wh/kg), but deliver a very low power density (100-500 W/Kg), requiring typically hours for re-charge. Lithium-ion batteries also pose some safety concern. The low power density or long re-charge time of a lithium ion battery is due to the mechanism with which lithium ions are shuttled between a negative electrode (anode) and a positive electrode (cathode), in which lithium ions must enter or intercalate into, for instance, inter-planar spaces of a graphite crystal at the anode (during re-charge) and into the complex oxide crystal (e.g. lithium cobalt oxide or lithium iron titanate) or other lithium insertion compound at the cathode. This intercalation or diffusion process requires a long time to accomplish. For instance, the current lithium-ion battery for plug-in hybrid vehicles requires 2-6 hours of recharge time, as opposed to just seconds for supercapacitors.

Table 1 provides a comparison of characteristics between conventional supercapacitors and conventional lithium-ion batteries.

TABLE 1

Comparison between supercapacitors and lithium-ion batteries.

| Characteristics | Ultracapacitors or Supercapacitors | Lithium-Ion Batteries |
|---|---|---|
| Main Advantages | High power density; Long cycle life; Recharged in seconds; Relatively safe | Moderate power density; High energy density |
| Main Disadvantages | Low energy density | Safety concern; long recharge time |
| Energy Density | 3-6 Wh/kg (conventional) | 100-180 Wh/kg |
| Power Density | 5,000-10,000 W/Kg | 100-500 W/Kg |
| Deep Cycle Life | 500,000-1,000,000 | 500-2000 |
| Cycling Efficiency | >95% | <80% |
| Cell Voltage | 2.7 V | 3.6/3.7 V |
| Temperature Range | −50° C.-50° C. | −10° C.-50° C. |
| Discharge Time | Seconds | Minutes to hour |
| Recharge Time | Seconds | Hours |

The above discussion suggests that an energy storage device that is capable of storing as much energy as a battery and yet can be fully recharged in one or two minutes like a supercapacitor would be considered a revolutionary advancement in energy technology. This was precisely the objective of our research and development efforts that led to the instant invention.

Instead of using inorganic lithium insertion compound, such as $LiCoO_2$ and $LiFePO_4$, that require lithium insertion and extraction from a bulk inorganic particle (typically 100 nm-20 μm, but more typically 1-10 μm), several attempts have been made to use organic molecules or polymers as an electrode active material for the cathode (lithium metal as the anode). For instance, Le Gall, et at investigated Poly(2,5-dihydroxy-1,4-benzoquinone-3,6-methylene) as an organic polymer cathode [T. Le Gall, et al. J. Power Sources, 119 (2003) 316-320] and Chen, et at used $Li_xC_6O_6$ organic electrode, obtained from a renewable source, in a lithium ion battery [H. Chen, et al. "From biomass to a renewable $Li_xC_6O_6$ organic electrode for sustainable Li-ion batteries," ChemSusChem, 1 (2008) 348-355]. Unfortunately, these organic materials exhibit very poor electronic conductivity and, hence, electrons could not be quickly collected or could not be collected at all. Although these organic molecules contain carbonyl groups (>C=O) that presumably could readily react with lithium ions (forming a redox pair), this redox mechanism was overwhelmed by the poor electronic conductivity. As a result, the battery cells featuring these organic molecules exhibit poor power densities. Le Gall et at added a large proportion of conductive acetylene black (typically 40-60% by weight) to partially overcome the conductivity issue; but, acetylene black significantly dilutes the amount of the active material. Further, the best achievable specific capacity of 150 mAh/g is far less than the theoretical specific capacity of 705 mAh/g of Poly(2,5-dihydroxy-1,4-benzoquinone-3,6-methylene).

Recently, more electrically conducting carbon nano-tubes (CNTs) containing carbonyl groups were used by Lee, et at to replace the organic molecules for use as a cathode material [S. W. Lee, et al, "High Power Lithium Batteries from Functionalized Carbon Nanotubes," *Nature Nanotechnology*, 5 (2010) 531-537]. The significantly higher electronic conductivity of CNTs does serve to overcome the poor conductivity problem of organic molecules. However, the CNT-based approach still suffers from several relatively insurmountable technical and economical issues, which call into question the commercial viability or utility value of this approach. Some of these issues are:

(1) CNTs are known to be extremely expensive due to the low yield, low production rate, and low purification rate commonly associated with the current CNT preparation processes. The high material costs have significantly hindered the widespread application of CNTs.

(2) CNTs tend to form a tangled mess resembling a hairball, which is difficult to work with (e.g., difficult to disperse in a liquid solvent or resin matrix).

(3) The so-called "layer-by-layer" approach (LBL) used by Lee, et al is a slow and expensive process that is not amenable to large-scale fabrication of battery electrodes. The LBL process has not been used in any significant amount of commercialized products.

(4) The LBL provides quality electrodes of up to 3 or 4 µm in thickness only. A useful battery or supercapacitor electrode thickness is typically in the range of 50-500 µm.

(5) CNT-based electrodes prepared without using the LBL approach did not show particularly good performance. There was no data to prove that CNT-based electrodes of practical thickness could even work due to the poor dispersion and electrolyte inaccessibility issues.

(6) CNTs have very limited amount of suitable sites to accept any functional group without damaging the basal plane or graphene plane structure. A CNT only has one end that is readily functionalizable and this end is an extremely small proportion of the total CNT surface. By chemically functionalizing the exterior basal plane, one would dramatically compromise the electronic conductivity of a CNT.

Hence, there exists an urgent need to develop a new class of highly conducting electrode materials having a functional group that is capable of forming a redox reaction with lithium ions. These materials must have an adequate amount of readily functionalizable sites to host a desired amount of useful functional groups. These materials must be mass-producible with low costs. These materials must be stable in a wide temperature range (e.g. −40° C. to 60° C., a commonly operating range for a battery). After an extensive and intensive research and development work, we have discovered a new type of electrode materials that meet this set of stringent technical and economical requirements.

This new type of materials includes chemically functionalized exfoliated graphite (or graphite worms composed of inter-connected graphite flakes) and the chemically functionalized nano graphene platelets (f-NGPs) that are isolated and separated graphite flakes containing a layer of graphene plane or a plurality of layers of graphene planes with a thickness less than 100 nm. These NGPs can be obtained by severing the interconnections between flakes in a graphite worm. In other words, an NGP is an individual basal plane of carbon atoms (a single-layer graphene sheet) or a stack of multiple graphene sheets. A single-layer graphene sheet is basically a 2-D hexagon lattice of $sp^2$ carbon atoms covalently bonded along two plane directions. The sheet is essentially one carbon atom thick, which is smaller than 0.34 nm. In the presently invented lithium super-battery, the interconnected graphite flakes in a graphite worm and/or the separated/isolated NGPs have certain specific functional groups capable of reversibly and rapidly forming a redox pair with a lithium ion during the charge and discharge cycles of a battery cell.

Both exfoliated graphite and NGPs are obtained from a precursor material, such as graphite particles, using a low-cost process. As one example of the production processes, natural graphite powder may be immersed in a mixture of sulfuric acid, nitric acid, and potassium permanganate at room temperature for 2-96 hours. The resulting material is a graphite intercalation compound (GIC) or graphite oxide (GO). This material is then subjected to a thermal shock (e.g., 1,000° C. for 30-60 minutes) to obtain worm-like graphite structure commonly referred to as exfoliated graphite or graphite worms. A graphite worm is composed of many loosely interconnected graphite flakes with multiple pores that are of 1 nm to several microns in size. This is a weak and fluffy, 3-D material. Graphite worms may then be subjected to mechanical shearing (e.g., milling) or ultrasonication treatment to produce nano graphene platelets (NGPs) that are isolated, separated graphite structures typically composed of single graphene plane or multiple graphene planes. By definition, an NGP is an isolated, separated platelet having a thickness less than 100 nm. However, the NGPs in the instant invention are more typically less than 10 nm in thickness. In most cases, they contain 1-20 layers of graphene planes.

In the present context, NGPs refer to pristine, non-oxidized graphene, graphene oxide (GO), or chemically or thermally reduced GO. The oxygen content is typically ranged from essentially 0% (pristine graphene) to approximately 45% (heavily oxidized graphite or graphene oxide). The chemically or thermally reduced GO typically has an oxygen content from 1% to 25%, more typically from 1% to 5%. When oxidized, a single-layer graphene sheet has a thickness in the range of perhaps 0.5-1.0 nm.

Nano graphene materials have recently been found to exhibit exceptionally high thermal conductivity, high electrical conductivity, and high strength. As a matter of fact, single-layer graphene exhibits the highest thermal conductivity and highest intrinsic strength of all currently known materials. Another outstanding characteristic of graphene is its exceptionally high specific surface area. A single graphene sheet provides a specific external surface area of approximately 2,675 $m^2/g$ (that is accessible by liquid electrolyte), as opposed to the exterior surface area of approximately 1,300 $m^2/g$ provided by a corresponding single-wall CNT (interior surface not accessible by electrolyte). The electrical conductivity of graphene is slightly higher than that of CNTs.

Two of the instant applicants (A. Zhamu and B. Z. Jang) and their colleagues were the first to investigate NGP- and other nano graphite-based nano materials for supercapacitor application [L. Song, A. Zhamu, J. Guo, and B. Z. Jang "Nano-scaled Graphene Plate Nanocomposites for Supercapacitor Electrodes" U.S. Pat. No. 7,623,340 (Nov. 24, 2009); application submitted in 2006]. After 2007, researchers began to gradually realize the significance of nano graphene materials for supercapacitor applications [e.g., M. D. Stoller, et al, "Graphene-based Ultracapacitor," Nano Letters, Vo. 8 (2008) pp. 3498-3502]. However, these supercapacitors are not a lithium ion battery in which lithium ions are shuttled between an anode and a cathode.

In other prior investigations, non-functionalized NGPs were used as either (A) an anode active material (wherein the inter-planar spaces in a multiple-layer NGP serve as a host for intercalated lithium atoms) or (B) a supporting material for an anode active material (e.g., Si particles or coating adhered to the graphene surface and it is Si that absorbs or desorbs lithium) or cathode active material (e.g., $LiCoO_2$ and $LiFePO_4$, which are also lithium intercalation compounds). In each and every one of these earlier studies, lithium ions or atoms are intercalated or inserted into the interior crystal structure of a lithium intercalation compound and this insertion or extraction procedure is slow. None of these devices rely on select functional groups (attached at the edge or basal plane surfaces of a graphene sheet or platelet) that readily form a redox pair with a lithium ion from a lithium-containing electrolyte. Due to this slow process of lithium diffusion in and out of these intercalation compounds, these conventional lithium ion batteries do not exhibit a high power density and the batteries require a long re-charge time.

In contrast, the presently invented lithium super-battery relies on fast, reversible formation of a redox pair between a graphene-borne functional group and a lithium ion in the electrolyte. Since no intercalation involved, this process is fast and can occurs in seconds or even shorter. Hence, this is a totally new class of battery that exhibits an unparalleled and unprecedented combined performance of an exceptional power density, high energy density, long and stable cycle life, and wide operating temperature range.

SUMMARY OF THE INVENTION

This invention provides an electrochemical energy storage device comprising a positive electrode, a negative electrode, a porous separator disposed between the two electrodes, and a lithium-containing electrolyte in physical contact with the two electrodes, wherein the positive electrode comprises a plurality of chemically functionalized exfoliated graphite or separated nano graphene platelets having a functional group that reversibly reacts with a lithium atom or ion. The positive electrode preferably has a thickness greater than 10 μm, more preferably greater than 50 μm, and most preferably greater than 100 μm.

The functional group may be selected from —COOH, =O, —OH, —NH$_2$, —OR, —COOR, or an oxygen-containing group attached to a carbon atom at a graphene platelet, where R is a hydrocarbon radical. The functional groups may be present at an edge surface and/or a basal plane surface.

The negative electrode (anode) comprises an electrode active material capable of absorbing or desorbing lithium. A wide range of electrode active materials may be used for this purpose, including those that are traditionally used as an anode active material and those traditionally used as a cathode active material of a conventional lithium-ion battery.

For instance, quite surprisingly, the electrode active material herein used at the anode may be selected from those materials that are commonly used as a cathode active material in a conventional lithium-ion or lithium metal battery (e.g., as illustrated in FIG. 1(D) and FIG. 1(E)). These include, as examples, lithium cobalt oxide, lithium nickel oxide, lithium manganese oxide, lithium manganese oxide, lithium vanadium oxide, lithium mixed metal oxide, lithium iron phosphate (FIG. 1(B)), lithium vanadium phosphate, lithium manganese phosphate, a lithium transition metal phosphate, lithium mixed metal phosphate, lithiated metal sulfide, or a combination thereof. These are what used to be cathode materials, but are now anode materials in the presently invented lithium super-battery. This is another manifestation of the uniqueness of this new class of lithium battery.

Alternatively and preferably, the electrode active material in the anode of the presently invented lithium super-battery may be selected from, as examples, lithium metal (FIG. 1(A)), a lithium metal alloy, a lithiated compound, a mixture of lithium or lithium alloy with a lithium intercalation compound (e.g., Li powder or Li foil+Si or Sn, etc.), lithiated titanium dioxide, lithium titanate, lithium manganate, a lithium transition metal oxide, $Li_4Ti_5O_{12}$ (FIG. 1(C)), or a combination thereof. These lithium-containing materials or lithiated compounds are commonly used as an anode active material in a conventional lithium-ion battery. Actually, these lithium-containing or lithiated compounds are preferred anode materials for use in the presently invented lithium super-battery.

The lithium intercalation compound may be selected from the following groups of materials, which are capable of absorbing or desorbing lithium ions or atoms:

(a) Silicon (Si), germanium (Ge), tin (Sn), lead (Pb), antimony (Sb), bismuth (Bi), zinc (Zn), aluminum (Al), Titanium (Ti), and cadmium (Cd);

(b) The alloys or intermetallic compounds of Si, Ge, Sn, Pb, Sb, Bi, Zn, Al, Ti, or Cd, stoichiometric or non-stoichiometric with other elements;

(c) The oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, Ti, Mn, or Cd. For instance, SnO or $SnO_2$ may be admixed with oxides of B, Al, P, Si, Ge, Ti, Mn, Fe, or Zn and then subjected to heat treatments to obtain composite oxides. Co-oxides can contain lithium oxide; e.g., lithium transition metal oxides. Composite oxides may also be prepared by mechanical alloying (e.g., ball milling of a mixture of SnO and $B_2O_3$). SnO or $SnO_2$ alone is of particular interest due to their high theoretical capacities. Iron oxide or phosphate is of interest since $Li_6Fe_2O_3$ has a theoretical capacity of 1,000 mAh/g. The first cycle capacity of $Fe_3PO_7$ is found to reach 800 mAh/g. The capacity of $SnS_2$ is as high as 620 mAh/g and is stable under charge-discharge cycling conditions; and (d) Salts or hydroxides of Sn, e.g., $SnSO_4$ (with a reversible of 600 mAh/g), $Sn_2PO_4Cl$, (300 mAh/g even after 40 cycles), and $Sn_3O_2(OH)_2$ (300 mAh/g).

The electrode active material is preferably in a fine powder form having a dimension less than 1 μm, further preferably less than 0.5 μm, and most preferably less than 100 nm.

The nano graphene platelets could have an oxygen content in the range of 5% to 45% by weight based on the total graphene platelet weight, preferably in the range of 5% to 35% by weight, and more preferably in the range of 10% to 25% by weight.

Any electrolyte used in a conventional lithium-ion or lithium-metal battery can be used as an electrolyte in the presently invented lithium super-battery. Actually, there is no particular limitation placed on the type of electrolytes that can be used. However, they preferably contain lithium or lithium ions. They can be any lithium salt. They can also be a lithium salt-doped ionic liquid.

The nano graphene platelets can comprise single-layer graphene, and/or a few-layer graphene platelet formed of 2-10 graphene planes. Most preferably, the functionalized NGPs comprise a few-layer graphene platelet formed of 3-5 graphene planes. Morphologically, the NGPs may be relatively flat, or they may comprise curved graphene platelets or sheets.

At least one of the two electrodes can further comprise a nano material selected from a carbon nano-tube, carbon nano-fiber, activated carbon, carbon black, nano-wire, metal oxide nano-wire or fiber, conductive polymer nano-fiber, or a combination thereof to provide other desired properties (e.g. conductivity).

The lithium super-battery typically provides an energy density much higher than 200 Wh/kg and power density no lower than 45 Kw/kg, all based on the total functionalized electrode weight. In many cases, the energy density is higher than 300 Wh/kg and power density higher than 25 Kw/kg. In other cases, the energy density is greater than 400 Wh/kg (even higher than 500 Wh/kg) and power density greater than 15 Kw/kg.

Another preferred embodiment of the present invention is a process for producing functionalized graphene electrodes in lithium super-batteries. One of the preferred processes comprises the following steps:

(a) Exposing a laminar graphite material (e.g., natural graphite powder) to an intercalating and/or oxidizing agent to obtain a graphite intercalation compound (GIC) or graphite oxide (GO); e.g. by immersing graphite in a mixture of an intercalant (e.g., concentrated sulfuric acid) and an oxidant (e.g., nitric acid);

(b) Exposing the resulting GIC or GO to a thermal shock, preferably in a temperature range of 150-1,100° C. (more preferably 850-1,050° C.) for a short period of time (typically 15 to 60 seconds), to obtain exfoliated graphite or graphite worms;

(c) Dispersing the exfoliated graphite to a liquid or gaseous medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up graphite worms and/or to help attach desired functional groups to the oxidized NGPs, resulting in the formation of functionalized NGPs. The functionalizing agent may be an amine- or —$NH_2$-containing group, as used in several common curing agents for epoxy resins; and, optionally, (d) Aerosolizing the graphene-liquid solution into liquid droplets containing chemically functionalized single or multiple NGPs while concurrently removing the liquid to recover curved NGPs containing desired functional groups. Without the aerosolizing step, the resulting functionalized graphene platelets tend to be more flat-shaped.

In a particularly preferred embodiment of the present invention, the process of producing a positive electrode of the present invention is to begin with preparation of pristine graphene (e.g. using a direct ultrasonication or supercritical fluid-assisted procedure), followed by partial oxidation, and then functionalization. This process allows for oxidation and functionalization of mainly the edge surfaces first. As oxidation/functionalization proceeds further, the top and bottom surfaces of a graphene sheet or platelet will begin to be decorated or bonded with desired functional groups capable of rapidly and reversibly reacting with lithium ions or atoms.

BRIEF DESCRIPTION OF THE DRAWINGS

FIG. 1(A) a lithium super-battery cell with a lithium metal anode and a cathode made of functionalized NGPs and/or functionalized exfoliated graphite; (B) a lithium super-battery cell with a lithium iron phosphate anode and a cathode made of functionalized NGPs and/or exfoliated graphite (it may be noted that lithium iron phosphate is commonly used as a cathode material in a conventional lithium-ion battery); (C) a lithium super-battery cell with a lithium titanate anode and a cathode made of functionalized NGPs and/or exfoliated graphite; (D) a prior art lithium ion battery cell using graphite or Si as an anode active material and lithium iron phosphate (or lithium cobalt oxide, etc) as a cathode active material; and (E) a prior art lithium ion battery cell using lithium titanate as an anode active material and lithium iron phosphate (or lithium cobalt oxide, etc) as a cathode active material.

FIG. 2($a$) A scanning electron microscopic image of curved NGPs; ($b$) A transmission electron microscopic image of flat NGPs prepared by using a conventional process.

FIG. 3($a$) cyclic voltammograms of a lithium super-battery formed of a Li metal anode and a functionalized graphene cathode at two different scan rates.

FIG. 7($a$) Some of the desired functional groups at the edge or basal plane surface of NGPs; ($b$) A scientifically plausible lithium ion exchange mechanism.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

For the purpose of defining the geometry of an NGP, the NGP is described as having a length (the largest dimension), a width (the second largest dimension), and a thickness. The thickness is the smallest dimension, which is no greater than 100 nm and, in the present application, no greater than 10 nm (preferably no greater than 5 nm). The NGP may be single-layer graphene. When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (with up to approximately 45% by weight oxygen). Graphene oxide can be thermally or chemically reduced to become reduced graphene oxide (typically with an oxygen content of 1-20%). For use in the cathode of the lithium super-battery, the oxygen content is preferably in the range of 5% to 25% by weight, and more preferably in the range of 10% to 25% by weight.

Figure 1:
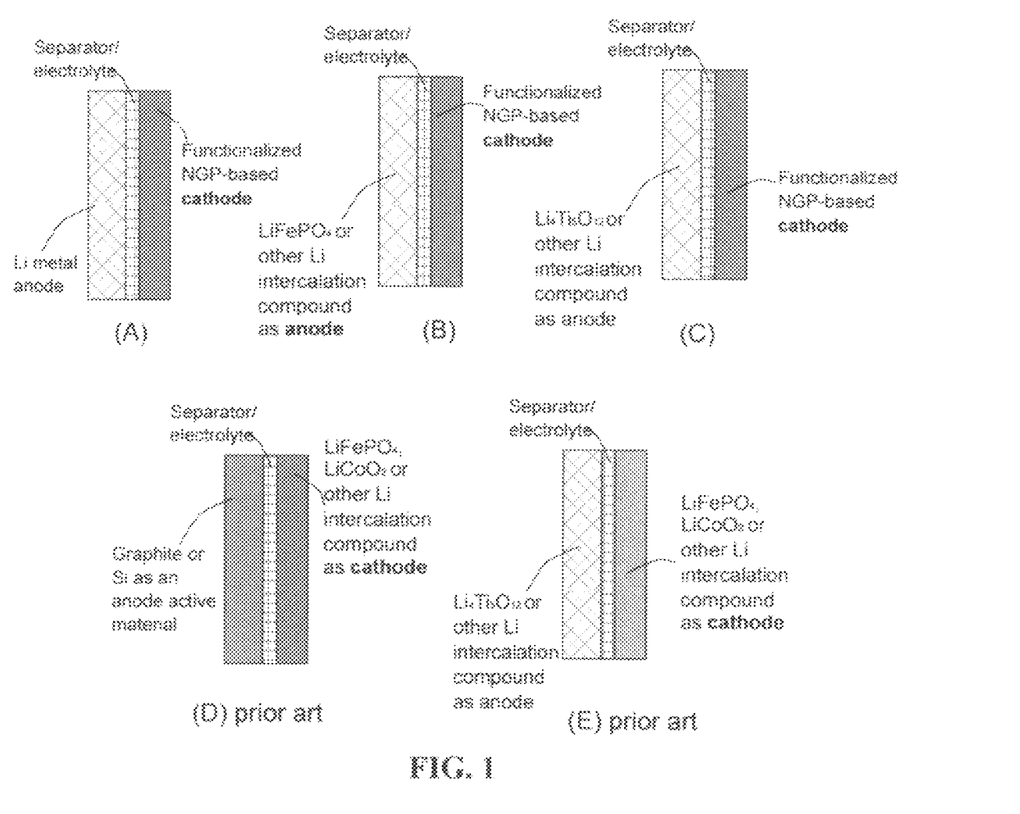
Figure 2A:
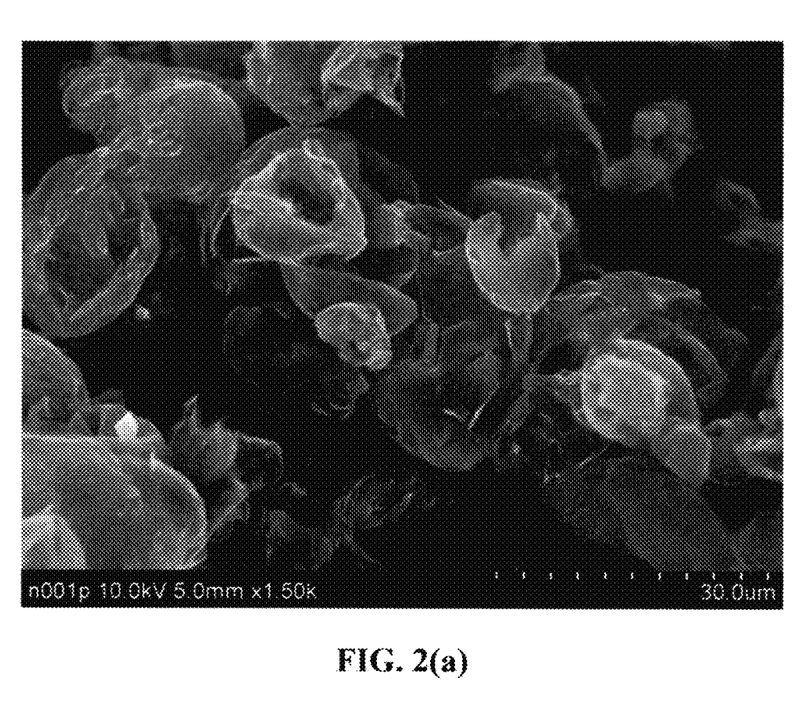
Figure 2B:
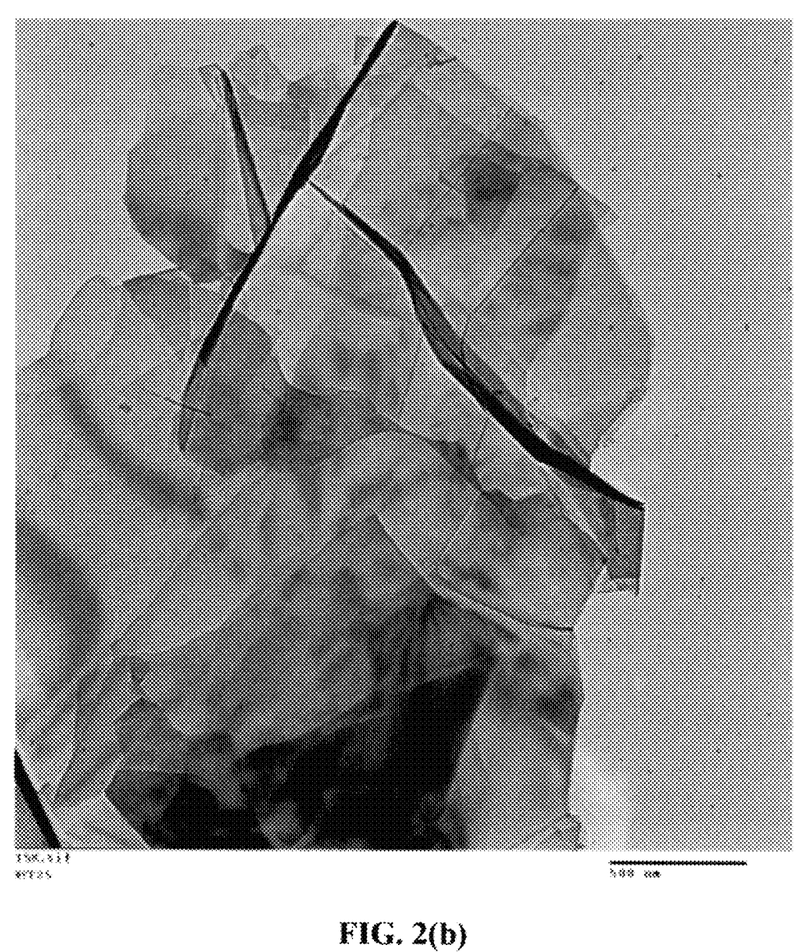

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. This phenomenon is illustrated in FIG. 2, wherein several single-layer graphene sheets overlap and re-stack tightly. There is no discernable gap or pore between two graphene sheets that are overlapped together. By contrast, FIG. 1 shows a new breed of graphene that is herein referred to as the curved graphene platelet or sheet. Curved NGPs of the instant invention are capable of forming a mesoporous structure having a desired pore size range (e.g. slightly >2 nm) when they were stacked together to form an electrode. This size range appears to be conducive to being accessible by the commonly used lithium-containing electrolytes.

The curved NGPs may be produced by using the following recommended procedures:
  (a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
  (b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);
  (c) dispersing the exfoliated graphite to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up graphite worms to form separated/isolated NGPs and/or to help attach desired functional groups to the oxidized NGPs, resulting in the formation of functionalized NGPs. The functionalizing agent may be an amine- or —$NH_2$-containing group, as used in several common curing agents for epoxy resins; and, optionally,
  (d) aerosolizing the graphene-liquid solution into liquid droplets containing chemically functionalized single or multiple NGPs while concurrently removing the liquid to recover curved NGPs containing desired functional groups. Without the aerosolizing step, the resulting functionalized graphene platelets tend to be flat-shaped.

It may be noted that steps (a) to (b) are the most commonly used steps to obtain exfoliated graphite and graphene oxide platelets in the field. Step (b) is designed for imparting additional functional groups to NGPs. Step (d) is essential to the production of curved graphene sheets. Oxidized NGPs or GO platelets may be chemically reduced to recover conductivity properties using hydrazine as a reducing agent, before, during, or after chemical functionalization.

The carboxylic acids, being environmentally benign, are particularly preferred functionalizing agents for imparting carbonyl or carboxylic groups to NGPs. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_nCOOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

The NGPs used in the aforementioned electrode may be subjected to the following treatments, separately or in combination, before or after the functionalization operation:
  (i) chemically functionalized with a different functional group. Other useful surface functional groups may include quinone, hydroquinone, quaternized aromatic amines, or mercaptans;
  (ii) coated or grafted with a polymer that contains a desired functional group (e.g., carbonyl group);
  (iii) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

The above-described processes produce graphene oxide platelets or oxidized NGPs. The heavy oxidation step involved in these processes intrinsically introduces oxygen-containing groups to both the edge surfaces and the basal plane surfaces (top and bottom surfaces) of an NGP. This can be good or bad. On the one hand, we would like to create as many functional groups as possible to maximize the lithium-capturing capacity. But, on the other hand, the functional groups on the basal or graphene plane necessarily inflict damage to the plane and significantly reduce the over-all conductivity of an NGP. The formation of functional groups in this manner, without step (c) above, is not a well-controlled process.

Fortunately, after very diligent research work, we have discovered an alternative way to impart functional groups to NGPs in a more controlled manner. This new way involves producing pristine NGPs without going through the conventional chemical intercalation/oxidation procedure. The produced non-oxidized graphene (naturally having edge surfaces being more chemically active) is then subjected to controlled oxidation or controlled functionalization. We have surprisingly found that functional groups were attached to the edge surfaces first and essentially exhausted the active sites at the edge surfaces before any significant amount of functional groups began to attach themselves to the basal planes.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production." Once pristine graphene is produced, the material is then exposed to an oxidation or functionalization treatment using, for example, a gaseous-phase or liquid acid or acid mixture. The pristine NGPs may also be immersed in carboxylic acids at a desired temperature for a period of time to obtain NGPs with a desired level of functionalization.

Specifically, the oxidation treatment comprises subjecting the pristine NGP material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the pristine NGP material to an oxidizing agent in a hydrogen-containing environment. Although oxidation treatment can be conducted by immersing NGPs in a liquid acid and/or oxidizer environment, such a procedure requires a subsequent water-rinsing and purification step (such a rinsing procedure is not as tedious as required in the case of conventional sulfuric acid-intercalation graphite, nevertheless). Hence, a gaseous treatment requiring no post-treatment rinsing is preferred.

A primary goal of the oxidation treatment is to impart a desired amount of functional groups to pristine NGPs without a significant compromise in electrical conductivity. After an extensive and in-depth study we have come to discover that conductive functionalized NGPs can be produced with an oxygen content no greater than 25% by weight, preferably between 5% and 25% by weight. Presumably, a majority of the functional groups are located at the edge surfaces of NGPs since the electrical conductivity would not be significantly reduced. Beyond 25% of over-all oxygen content, functional groups begin to appear on graphene plane surfaces, interrupting electron-conducting paths. The oxygen contents were determined using chemical elemental analysis and X-ray photoelectron spectroscopy (XPS).

The partially oxidized NGPs prepared according to a preferred embodiment of the present invention can be further functionalized by carrying out an additional step of contacting the partially oxidized NGPs with a reactant so that a functional group is added to a surface or edge of the nano graphene platelet. The functional group may contain alkyl or aryl silane, alkyl or aralkyl group, hydroxyl group, amine group, fluorocarbon, or a combination thereof.

The NGPs, after a partial oxidation treatment, will have a reactive graphene surface (RGS) or reactive graphene edge (RGE). They can be prescribed to undergo the following reactions:
(a) RGS/RGE+$CH_2$=CHCOX (at 1,000° C.)→Graphene-R'COH (where X=—OH, —Cl, or —$NH_2$); e.g., RGS/RGE+$CH_2$=CHCOOH→G-R'CO—OH (where G=graphene);
(b) RGS/RGE+Maleic anhydride→G-R'$(COOH)_2$;
(c) RGS/RGE+$CH_2$=CH—$CH_2$X→G-R'$CH_2$X (where X=—OH, -halogen, or —$NH_2$);
(d) RGS/RGE+$H_2O$→G=O (Quinoidal);
(e) RGS/RGE+$CH_2$=CHCHO→G-R'CHO (Aldehydic);

In the above-listed reactions, R' is a hydrocarbon radical (alkyl, cycloalkyl, etc). Partial oxidation of pristine NGPs can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides.

Any reaction capable of attaching carbonyl (>C=O) or amine (—$NH_2$) group to the graphene edge or basal plane surface may be used for practicing the instant invention. The following examples serve to illustrate the preferred embodiments of the present invention and should not be construed as limiting the scope of the invention:

EXAMPLE 1

Functionalized NGPs from Carbon/Graphite Fibers

Continuous graphite fiber yarns (Amoco P-55) were cut into segments of 5 mm long and then ball-milled for 24 hours. Approximately 20 grams of these milled fibers were immersed in a mixture of sulfuric acid, nitric acid, and potassium permanganate at a ratio of 4:1:0.052 at 30° C. for 48 hours. Following the chemical oxidation/intercalation treatment, the resulting intercalated/oxidized fibers were washed with water and dried. The resulting product is an acid-intercalated/oxidized graphite fiber material containing graphite oxide crystallites.

Subsequently, approximately ½ of the intercalated or oxidized fiber sample was transferred to a furnace pre-set at a temperature of 850° C. for 30 seconds. The compound was found to induce extremely rapid and high expansions of graphite crystallites. The as-exfoliated graphite fiber is designated as Sample-1a. Approximately half of Sample 1-a material was dispersed back to the mixture of formic acid and hydrogen peroxide at 25° C. for 60 minutes to obtain a suspension (Sample-1b). The remaining half was dispersed in water to obtain another suspension. Both suspensions were subjected to ultrasonication for further separation of exfoliated flakes. The thickness of individual platelets was found to range from two graphene sheets to approximately 25 graphene sheets (average of 14 sheets or approximately 4.7 nm) based on SEM and TEM observations. The length of these NGPs was typically in the range of 20-40 µm and width in the range of 0.5-2 µm.

For each sample, a thin film of graphene sheets was made by casting the suspension onto a glass surface and removing the solvent in a vacuum oven at 60° C. A four-point probe method was used to measure the electrical conductivity of the thin films on the glass substrate. It was found that the conductivity of the film prepared from Sample 1-a (as-exfoliated GO platelets) was approximately $1.4 \times 10^{-2}$ S/cm while that of Sample 1-b was $1.3 \times 10^{-2}$ S/cm. Further functionalization of heavily oxidized graphene did not further reduce the electrical conductivity of NGPs.

Coin cells using functionalized NGPs as the cathode and a thin lithium foil or lithium titanate as an anode were made and tested. These cells presumably work on the redox reactions of lithium ions with select functional groups on the surfaces of NGPs. These functional groups, attached to both the edge and graphene plane surfaces, are capable of rapidly and reversibly react with lithium. This revolutionary new energy storage device fundamentally differs from a supercapacitor since an electric double layer (EDL) supercapacitor relies on the formation of EDL charges at the electrode-electrolyte interface. This device also differs from conventional lithium ion batteries where lithium intercalates into inter-graphene spaces in a graphite particle of an anode (FIG. 1(D)) or where both the anode and cathodes are based on lithium intercalation compounds (e.g. FIG. 1(E)). In the presently invented lithium super-battery, functionalized graphene (f-G or f-NGP) is used at the cathode and lithium metal (FIG. 1(A)), lithium titanate (as an example, FIG. 1(C)), or lithium cobalt oxide or lithium iron phosphate (which is used as a cathode active material in the conventional lithium ion battery) is used at the anode (FIG. 1(C)).

Electrochemical measurements were conducted using a two-electrode electrochemical cell or coin cell consisting of an NGP electrode, one sheet of micro-porous membrane (Celgard 2500) and lithium foil as the counter-electrode. In another case, lithiated lithium titanate (LTO or $Li_4Ti_5O_{12}$) was used as the negative electrode. A piece of carbon-coated aluminum foil (25 mm thick) in contact with an electrode was used as a current collector. The electrolyte solution was 1 M $LiPF_6$ dissolved in a mixture of ethylene carbonate (EC) and dimethyl carbonate (DMC) with a 3:7 volume ratio. The separator was wetted by a minimum amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

EXAMPLE 2

NGPs from Sulfuric Acid Intercalation and Exfoliation of MCMBs

MCMB 2528 microbeads (Osaka Gas Chemical Company, Japan) have a density of about 2.24 $g/cm^3$; a median size of about 22.5 microns, and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 600° C. for 30 seconds to obtain Sample 2-a. Approximately one half of the exfoliated MCMB sample was subjected to further functionalization in formic acid at 25° C. for 30 minutes in an ultrasonication bath to obtain Sample 2-b. A small quantity of Sample 2-a was mixed with water and ultrasonicated at a 60 W power for 10 minutes to obtain a suspension. Again, thin films were prepared from each suspension by dip coating and the electrical conductivity of the films was measured. The conductivity of the film prepared from Sample 2-a (as-exfoliated MCMB platelets) was found to be approximately $1.8 \times 10^{-2}$ S/cm. Electrochemical testing was conducted using the same procedures described in Example 1. Both graphite worms and subsequently isolated NGPs were used as a cathode material. The energy density of a lithium super-battery featuring chemically functionalized exfoliated graphite worms from MCMBs is lower than that of fully separated NGPs from MCMBs, but higher than that of a corresponding battery cell featuring functionalized carbon nano-tubes.

EXAMPLE 3

Oxidation, Exfoliation, Separation, and Further Functionalization of Natural Graphite Graphite oxide samples were prepared by oxidation of graphite flakes with sulfuric acid, sodium nitrate, and potassium permanganate at a ratio of 4:1:0.05 at 30° C. for 12 hours, 24 hours, 48 hours and 96 hours, respectively. Upon completion of each reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours. The interlayer spacing of the resulting laminar graphite oxide was determined by the Debey-Scherrer X-ray technique to be approximately 0.55 nm, 0.57, 0.67 nm, and 0.73 nm (7.3 Å), respectively, indicating that graphite has been heavily oxidized in the two long treatments.

The dried, intercalated (oxidized) compound was each divided into two batches, both for exfoliation at 1,050° C. for 1 minute by placing the sample in a quartz tube that was inserted into a horizontal tube furnace pre-set at 1,050° C. The exfoliated products were each mixed with water and then subjected to a mechanical shearing treatment using a Cowles rotating-blade shearing machine for 20 minutes. The resulting platelets were found to have an average thickness of 7.8 nm, 4.2 nm, 2.18 nm, and 1.1 nm, respectively. One batch of each sample was subjected to carboxylic acid treatment and the other amidation treatment. The oxygen and nitrogen contents in the two samples, based on the elemental analysis using X-ray photoelectron spectroscopy (XPS), were for those oxygen and nitrogen atoms in functional groups attached to the plane surfaces and edges of the platelets. Spin coating was used to prepare thin films for conductivity measurement.

EXAMPLE 4

Preparation of Pristine NGPs from Natural Flake Graphite Using Direct Ultrasonication Five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 75 W (Branson S450 Ultrasonicator) was used for exfoliation, separation, and size reduction for a period of 1 hour. This procedure was repeated several times, each time with five grams of starting graphite powder, to produce a sufficient quantity of pristine NGPs.

The oxidation treatment of the samples prepared in Examples 4 was carried out in two different ways: one in a liquid state and the other in a vapor/gas state.

As one example for vapor phase oxidation, $SO_3$ vapor was generated by adding and heating 10 g of fuming sulfuric acid into a reactor The $SO_3$ vapor was passed through a column in which 10 g of pristine NGPs was packed for the oxidation treatment for various durations of time, from 5 minutes to one hour. Upon completion of the oxidation, the column containing oxidized NGPs was slightly heated at about 60° C. for about 15 minutes to remove excessive amount of $SO_3$ condensed on the surface of the NGPs, and the separated $SO_3$ was recovered and absorbed into the sulfuric acid in the reactor. $SO_3$-treated NGPs were washed with water and filtered.

Another example for vapor/gas phase oxidation entails simply exposing NGPs to a heated oxygen or oxygen-containing gas environment (e.g., oxygen gas with a small amount of water, 1% by weight). A suitable temperature range is 250-500° C. for 10 to 120 minutes. It may be noted that graphite oxidation was generally believed to occur only at a temperature higher than 350° C. However, much to our surprise, oxidation of graphene could occur at as low as 200° C. This perhaps is due to the nano-scaled nature of NGPs.

Liquid state oxidation of pristine NGPs can be carried out by simply immersing NGPs in a solution containing an acid and/or oxidizer. More benign acids, such as acetic acid and formic acid, are preferred although it takes a longer period of time to complete an oxidation procedure as compared with sulfuric or nitric acid. More benign oxidizers, such as $H_2O_2$, are preferred over other strong oxidizers, such as potassium permanganate. It was more difficult to wash and remove a salt like potassium permanganate from treated NGPs.

Partially oxidized NGPs, single-layer or multi-layer, prepared in this example were then subjected to controlled functionalization by —COOH or $NH_2$ to produce two separate sets of samples.

For those samples prepared from oxidation of pristine NGPs, the conductivity is normally greater than 1 S/cm if the oxygen content is less than 25% by weight. However, the electrical conductivity of those prepared by partially oxidizing pristine NGPs is almost always greater than that of those prepared by partially de-oxygenating GO nano platelets with a comparable oxygen content. This is another highly surprising result of the present study. We speculated that those heavily oxidized GO platelets were highly defected, likely with their graphene plane populated with oxygen-containing chemical groups. After partial de-oxygenation, these original chemical group sites remain as structural defects. By contrast, oxidation of pristine NGPs might begin with the graphene edges and chemical groups began to attach to the graphene surface only after the edges were fully oxidized. Such an observation allows us to functionalize NGPs in a well-controlled manner.

Figure 3A:
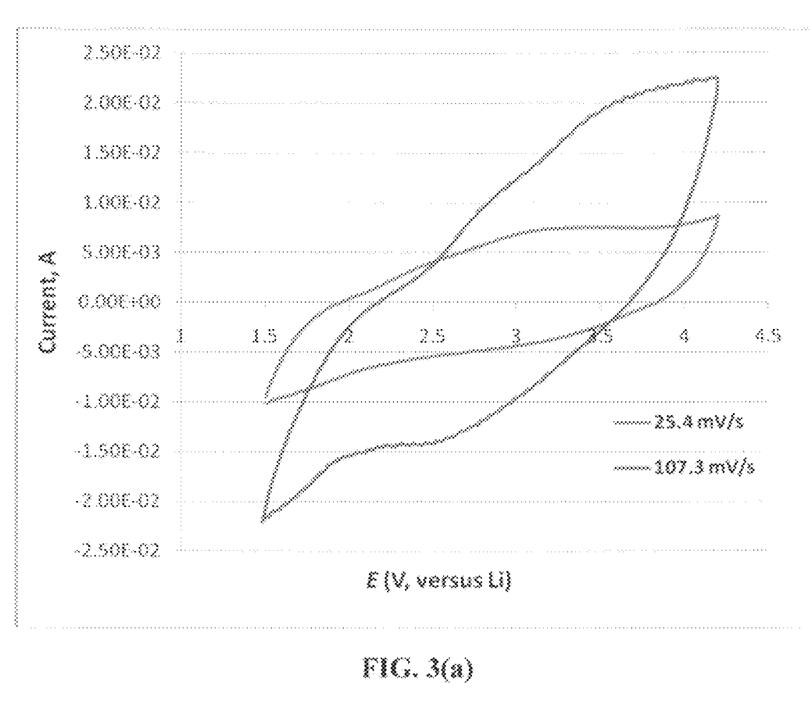
Figure 7:
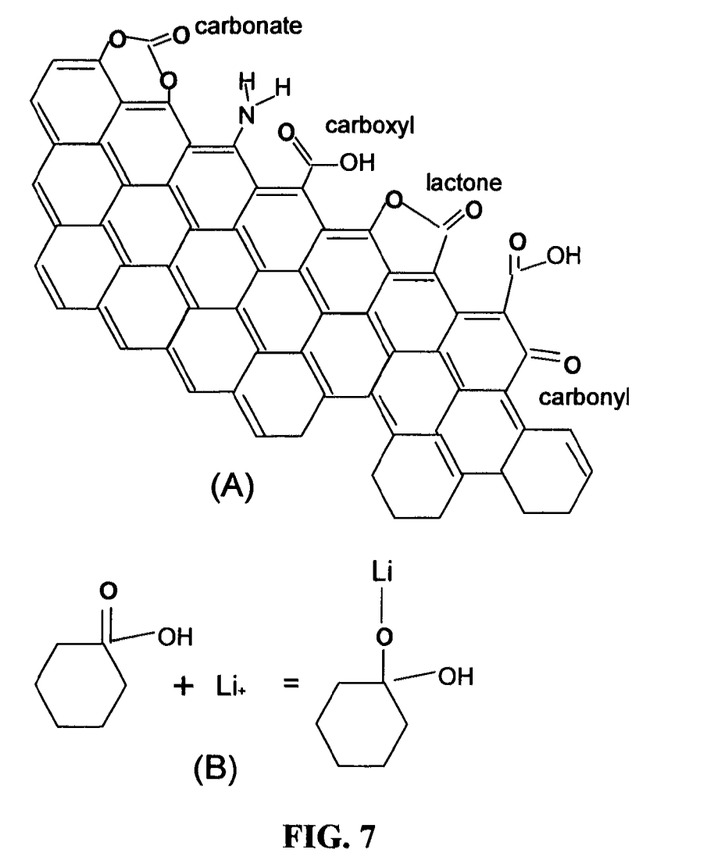

The CV curves shown in FIG. 3 clearly indicate a redox-type chemical reaction between the functionalized NGPs and lithium ions of the electrolyte. Not wishing to be bound by the theory, but we hypothesize that functional groups, such as —COOH, =O, and —$NH_2$, can reversibly capture a lithium ion, e.g., according to the mechanism illustrated in FIG. 7(B). Our extensive research has indicated that graphene oxide typically has several types of oxygen-containing groups attached to the edge or top/bottom surface of a graphene platelet/sheet (e.g., FIG. 7(A)).

Figure 4:
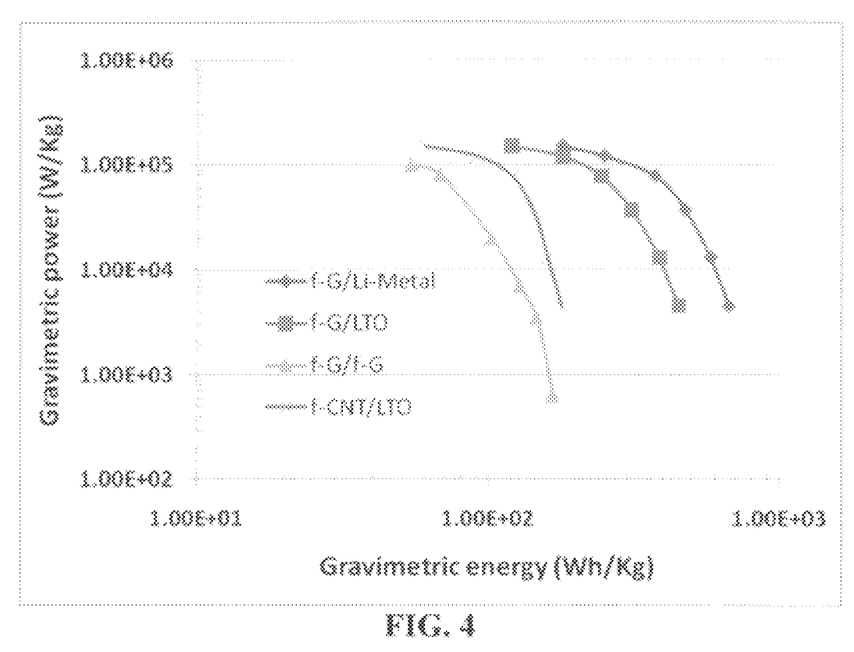
FIG. 4. Ragone plot of several functionalized graphene-based lithium super-batteries and a carbon nano-tube-based lithium super-battery.

As shown in the Ragone plot (power density versus energy density) of FIG. 4, the cathode featuring selectively functionalized NGPs can store lithium up to an energy density of 640 Wh/Kg (based on the NGP electrode weight) for a lithium metal-functionalized NGP cell while also delivering a power density of 4.5 kW/Kg (electrode weight) at such a high energy density level. The cell delivers a power density as high as 150 kW/Kg (which is higher than that of the best supercapacitor by a factor of 2-10) while maintaining an energy density of 180 Wh/Kg (which is also higher than that of the best supercapacitor by a factor of 6).

According to the data of FIG. 4, an energy storage device using the NGP electrode as the positive electrode and lithium titanium oxide ($Li_4Ti_5O_{12}$) as a negative electrode had a gravimetric energy ~4 times higher than that of conventional supercapacitors and power density ~60 times higher than that of conventional lithium-ion batteries. This is truly a breakthrough technology.

Figure 5:
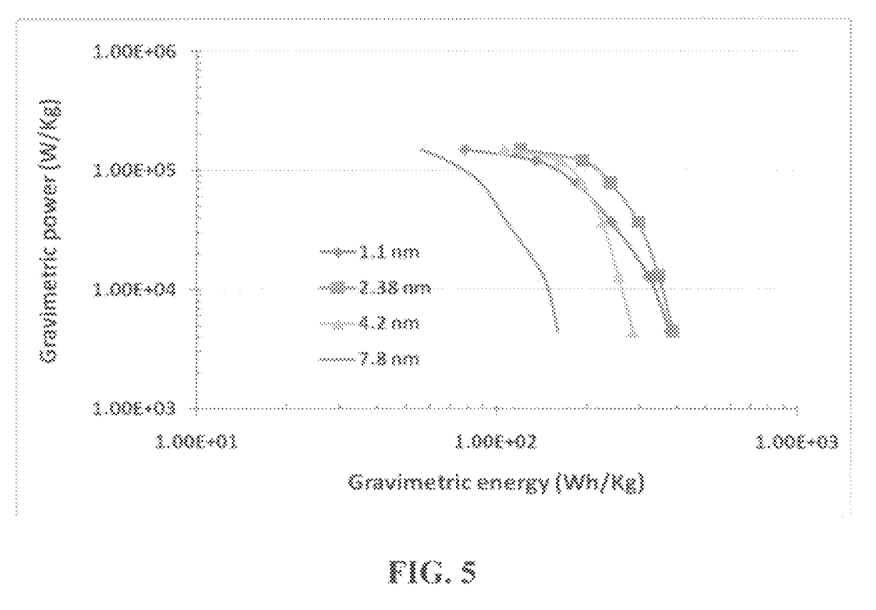
FIG. 5. Ragone plot of several functionalized graphene-based lithium super-batteries containing NGPs of different thicknesses or numbers of layers.
Figure 6:
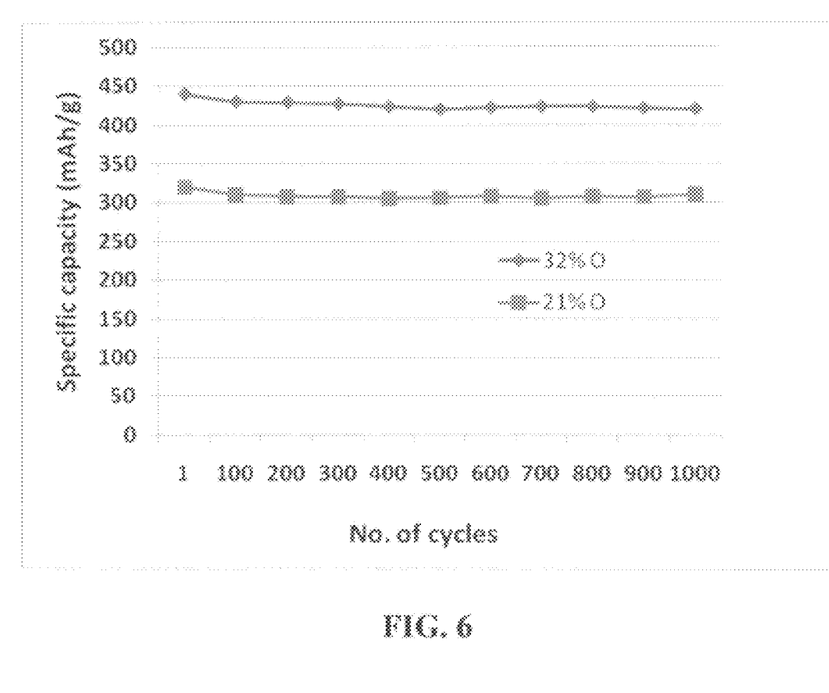
FIG. 6 Capacity decay over time for two lithium super-batteries featuring functionalized exfoliated graphite of different oxygen contents (hence, different concentrations of functional groups capable of reversibly reacting with lithium ions in the electrolyte.

Shown in FIG. 5 is the Ragone plot of several lithium super-battery cells all having a lithium titanate anode and a functionalized NGP cathode, but the NGPs in each sample are different in thickness or number of layers. These NGPs from Example 3 have an average thickness of 7.8 nm (mostly 15-20 layers of graphene planes), 4.2 nm (mostly 6-10 layers), 2.18 nm (mostly 3-5 layers), and 1.1 nm (mostly single-layer), respectively. The data indicate that the thinner NGPs (single-layer and 3-5 layers) provide the highest energy densities when the voltage scanning rates or charge-discharge rates are low. This implies that there is a high concentration of active functional groups per unit weight of the NGP electrode. The single-layer graphene sheet is heavily decorated with functional groups all around the edges and on both surfaces. For those NGPs of 3-5 layers, the top and bottom layers and all the edge surfaces are likely loaded with functional groups. The internal layer(s) provide a supporting role, being a good electron-conducting channel.

The energy density values of these two functionalized NGP electrodes (single-layer and 3-5 layers) are higher than that of the electrode containing NGPs of 6-10 layers (average thickness of 4.2 nm) when the scanning rates are low. Quite surprisingly, the energy density of the single-layer NGPs becomes lower than that of the NGPs of 6-10 layers when the scanning rates are very high (hence, higher power density values). This could imply that the heavily oxidized single-layer graphene has a relatively low electrical conductivity and, hence, not capable of delivering a high energy density at high rates. By contrast, the NGPs with 6 layers of graphene plane may have the top layer ($1^{st}$ layer) and the bottom layer ($6^{th}$ layer) heavily oxidized (providing the needed carbonyl groups capable of reacting with lithium), but the internal layers ($2^{nd}$ to $5^{th}$ layers) serve as an electron-conducting path. The edges of the internal layers do provide reactive sites, but the primary role of these layers is to provide conductivity that enables these NGPs to deliver a high energy density when the rates are very high. This observation implies the significance of striking a balance between maximizing the concentration of functional groups and providing some un-oxidized layers to carry electrons. This implies that single-layer graphene, although a good choice, may not be the best choice for use as an electrode of the presently invented lithium super-battery.

Another surprising feature of the presently invented functionalized NGP electrode is the long-term stability during repeated charge-discharge cycles. As demonstrated in FIG. 7, the cell only loses a <5% capacity after 1,000 cycles. This is most impressive and has not been achieved by most of the lithium ion batteries reported today.

In conclusion, the instant invention provides a revolutionary energy storage device that has the best features of both the supercapacitor and the lithium ion battery. The device can deliver a power density higher than that of the best supercapacitor by a factor of 2-10 while also maintaining an energy density higher than that of the best supercapacitor by a factor of 6. A presently invented lithium super-battery using the functionalized NGP electrode as the positive electrode and lithium titanium oxide ($Li_4Ti_5O_{12}$) as a negative electrode has a gravimetric energy ~4 times higher than that of conventional supercapacitors and a power density ~60 times higher than that of conventional lithium-ion batteries. This is truly a breakthrough technology.

We claim:

1. A lithium super-battery or lithium-exchanging battery device comprising a positive electrode, a negative electrode, a porous separator disposed between the two electrodes, and a lithium-containing electrolyte in physical contact with the two electrodes, wherein the positive electrode comprises a plurality of chemically functionalized nano graphene platelets or exfoliated graphite having a functional group that reversibly reacts with a lithium atom or ion wherein said nano graphene platelets or exfoliated graphite contain an oxygen amount of at least 1% by weight or have a platelet less than 10 nm in thickness or having no greater than 20 graphene planes.

2. The lithium super-battery device of claim 1 wherein said nano graphene platelets or exfoliated graphite have a functional group selected from —COOH, =O, —OH, —NH$_2$, an oxygen-containing group attached to a carbon atom at a grapheme platelet, —OR, or —COOR, where R is a hydrocarbon radical.

3. The lithium super-battery device of claim 1 wherein said negative electrode comprises an electrode active material capable of absorbing or desorbing lithium.

4. The lithium super-battery device of claim 1 wherein said positive electrode comprises nano graphene platelets or exfoliated graphite having a functional group selected from —COOH, =O, —OH, —NH$_2$, —OR, —COOR, or an oxygen-containing group attached to a carbon atom at a graphene platelet, where R is a hydrocarbon radical and wherein the negative electrode comprises an electrode active material capable of absorbing or desorbing lithium.

5. The lithium super-battery device of claim 3 wherein said electrode active material is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof.

6. The lithium super-battery device of claim 5, wherein the lithium intercalation compound is selected from the following groups of materials, which are capable of absorbing or desorbing lithium ions or atoms:
   (a) Silicon (Si), germanium (Ge), tin (Sn), lead (Pb), antimony (Sb), bismuth (Bi), zinc (Zn), aluminum (Al), Titanium (Ti), cadmium (Cd), and mixtures thereof;
   (b) Alloys or intermetallic compounds of Si, Ge, Sn, Pb, Sb, Bi, Zn, Al, Ti, or Cd;
   (c) Oxides, carbides, nitrides, sulfides, phosphides, selenides, tellurides, or antimonides of Si, Ge, Sn, Pb, Sb, Bi, Zn, Al, Fe, Ti, Mn, or Cd and mixtures or composites thereof; and
   (d) Salts or hydroxides of Sn.

7. The lithium super-battery device of claim 4 wherein said electrode active material is selected from lithium metal, a lithium metal alloy, a mixture of lithium metal or lithium alloy with a lithium intercalation compound, a lithiated compound, lithiated titanium dioxide, lithium titanate, lithium manganate, a lithium transition metal oxide, $Li_4Ti_5O_{12}$, or a combination thereof.

8. The lithium super-battery device of claim 7, wherein the lithium intercalation compound is selected from the following groups of materials, which are capable of absorbing or desorbing lithium ions or atoms:
   (a) Silicon (Si), germanium (Ge), tin (Sn), lead (Pb), antimony (Sb), bismuth (Bi), zinc (Zn), aluminum (Al), Titanium (Ti), cadmium (Cd), and mixtures thereof;
   (b) Alloys or intermetallic compounds of Si, Ge, Sn, Pb, Sb, Bi, Zn, Al, Ti, or Cd;
   (c) Oxides, carbides, nitrides, sulfides, phosphides, selenides, tellurides, or antimonides of Si, Ge, Sn, Pb, Sb, Bi, Zn, Al, Fe, Ti, Mn, or Cd and mixtures or composites thereof; and
   (d) Salts or hydroxides of Sn.

9. The lithium super-battery device of claim 5 wherein said electrode active material is in a fine powder form having a dimension less than 1 μm.

10. The lithium super-battery device of claim 7 wherein said electrode active material is in a fine powder form having a dimension less than 0.5 μm.

11. The lithium super-battery device of claim 7 wherein said electrode active material is in a fine powder form having a dimension less than 100 nm.

12. The lithium super-battery device of claim 3 wherein said electrode active material is selected from lithium cobalt oxide, lithium nickel oxide, lithium manganese oxide, lithium manganese oxide, lithium vanadium oxide, lithium mixed metal oxide, lithium iron phosphate, lithium vanadium phosphate, lithium manganese phosphate, a lithium transition metal phosphate, lithium mixed metal phosphate, lithiated metal sulfide, or a combination thereof.

13. The lithium super-battery device of claim 4 wherein said electrode active material is selected from lithium cobalt oxide, lithium nickel oxide, lithium manganese oxide, lithium manganese oxide, lithium vanadium oxide, lithium mixed metal oxide, lithium iron phosphate, lithium vanadium phosphate, lithium manganese phosphate, a lithium transition metal phosphate, lithium mixed metal phosphate, lithiated metal sulfide, or a combination thereof.

14. The lithium super-battery device of claim 12 wherein said electrode active material is in a fine powder form having a dimension less than 0.5 μm.

15. The lithium super-battery device of claim 13 wherein said electrode active material is in a fine powder form having a dimension less than 100 nm.

16. The lithium super-battery device of claim 1 wherein said nano graphene platelets or exfoliated graphite have an oxygen content in the range of 5% to 45% by weight based on the total graphene platelet weight.

17. The lithium super-battery device of claim 1 wherein said nano graphene platelets or exfoliated graphite have an oxygen content in the range of 5% to 25% by weight based on the total graphene platelet weight.

18. The lithium super-battery device of claim 1 wherein said nano graphene platelets or exfoliated graphite have an oxygen content in the range of 10% to 20% by weight based on the total graphene platelet weight.

19. The lithium super-battery device of claim 1 wherein said electrolyte comprises a lithium salt-doped ionic liquid.

20. A lithium super-battery device comprising a positive electrode, a negative electrode, a porous separator disposed between the two electrodes, and a lithium-containing electrolyte in physical contact with the two electrodes, wherein the positive electrode comprises a plurality of chemically functionalized nano graphene platelets or exfoliated graphite having a functional group that reversibly reacts with a lithium atom or ion wherein said nano graphene platelets or exfoliated graphite comprise single-layer graphene.

21. A lithium super-battery device comprising a positive electrode, a negative electrode a porous separator disposed between the two electrodes, and a lithium-containing electrolyte in physical contact with the two electrodes, wherein the positive electrode comprises a plurality of chemically functionalized nano graphene platelets or exfoliated graphite having a functional group that reversibly reacts with a lithium atom or ion wherein said nano graphene platelets or exfoliated graphite comprise a few-layer graphene platelet formed of 2-10 graphene planes.

22. The lithium super-battery device of claim 1 wherein said nano graphene platelets comprise a few-layer graphene platelet formed of 3-7 graphene planes.

23. The lithium super-battery device of claim 1 wherein said nano graphene platelets comprise curved graphene platelets.

24. The lithium super-battery device of claim 1 wherein at least one of the two electrodes further comprises a nano material selected from a carbon nano-tube, carbon nano-fiber, activated carbon, carbon black, nano-wire, metal oxide nano-wire or fiber, conductive polymer nano-fiber, or a combination thereof.

25. The lithium super-battery device of claim 1 wherein said device provides an energy density of no less than 200 Wh/kg and power density no lower than 45 Kw/kg, all based on the total electrode weight.

26. The lithium super-battery device of claim 1 wherein said device provides an energy density of no less than 300 Wh/kg and power density no lower than 25 Kw/kg, all based on the total electrode weight.

27. The lithium super-battery device of claim 1 wherein said device provides an energy density of no less than 500 Wh/kg and power density no less than 15 Kw/kg, all based on the total electrode weight.

28. The lithium super-battery device of claim 1 wherein said positive electrode has a thickness greater than 10 μm.

29. The lithium super-battery device of claim 1 wherein said positive electrode has a thickness greater than 50 μm.

30. The lithium super-battery device of claim 1 wherein said positive electrode has a thickness greater than 100 μm.

* * * * *